United States Patent
Das (10) Patent No.: US 9,430,677 B2
(45) Date of Patent: Aug. 30, 2016

(54) MEMORY MANAGEMENT SYSTEMS AND METHODS FOR EMBEDDED SYSTEMS

(75) Inventor: Dipankar Das, Pune (IN)

(73) Assignee: GM GLOBLA TECHNOLOGY OPERATIONS LLC, Detroit, MI (US)

( * ) Notice: Subject to any disclaimer, the term of this patent is extended or adjusted under 35 U.S.C. 154(b) by 426 days.

(21) Appl. No.: 13/545,472

(22) Filed: Jul. 10, 2012

(65) Prior Publication Data

US 2014/0019668 A1   Jan. 16, 2014

(51) Int. Cl.
  *G06F 9/455* (2006.01)
  *G06F 21/78* (2013.01)
  *G06F 21/52* (2013.01)
  *G06F 11/14* (2006.01)

(52) U.S. Cl.
  CPC .............. *G06F 21/78* (2013.01); *G06F 11/14* (2013.01); *G06F 21/52* (2013.01); *G06F 2212/2022* (2013.01)

(58) Field of Classification Search
  None
  See application file for complete search history.

(56) References Cited

U.S. PATENT DOCUMENTS

| | | | | |
|---|---|---|---|---|
| 6,081,665 A * | 6/2000 | Nilsen et al. | | 717/116 |
| 6,496,916 B1 * | 12/2002 | Fadavi-Ardekani et al. | | 711/173 |
| 7,272,748 B1 * | 9/2007 | Conover et al. | | 714/20 |
| 8,135,994 B2 * | 3/2012 | Keromytis et al. | | 714/38.11 |
| 8,291,400 B1 * | 10/2012 | Lee et al. | | 717/161 |
| 2005/0041644 A1 * | 2/2005 | Noguchi et al. | | 370/352 |
| 2006/0155791 A1 * | 7/2006 | Tene et al. | | 707/206 |
| 2008/0133866 A1 * | 6/2008 | Dickenson | | 711/170 |
| 2009/0083720 A1 * | 3/2009 | Bohizic et al. | | 717/140 |
| 2010/0299732 A1 * | 11/2010 | Zhang et al. | | 726/6 |
| 2013/0283248 A1 * | 10/2013 | Abadi | | G06F 8/76 717/136 |

OTHER PUBLICATIONS

Candea, G., Brown, A. B., Fox, A., and Patterson, D. 2004. Recovery-oriented computing: Building multitier dependability. IEEE Computer 37,11,60-67.
Berger, E. D. and Zorn, B. G. 2006. Diehard: probabilistic memory safety for unsafe languages. In PLDI, M. I. Schwartzbach and T. Ball, Eds. ACM, 158-168.
Carzaniga, A., Gorla, A., and Pezz'e, M. 2008. Self-healing by means of automatic workarounds. In SEAMS '08: Proceedings of the 2008 international workshop on Software engineering for adaptive and self-managing systems. ACM, New York, NY, USA, 17-24.
Demsky, B. and Rinard, M. C. 2006. Goal-directed reasoning for specification-based data structure repair. IEEE Trans. Softw. Eng. 32, 12, 931-951.
Etoh, H.. Gcc extensions for protecting application from stack smashing attacks [online]. 2010. Retrieved from Internet: <URL: www.trl.ibm.com/projects/security/ssp/>.

(Continued)

*Primary Examiner* — Ryan Bertram
*Assistant Examiner* — Trang Ta
(74) *Attorney, Agent, or Firm* — Ingrassia Fisher & Lorenz, P.C.

(57) ABSTRACT

Methods and systems are provided for managing static memory associated with software of an embedded system. The method includes performing one or more steps on one or more processors. The steps include selectively assigning memory objects to static memory segments based on access of the memory object by the software; managing data of the memory segments based on the assigning; and selectively restoring the data of the memory segments based on the managing.

18 Claims, 8 Drawing Sheets

(56) References Cited

OTHER PUBLICATIONS

Perkins, J. H., Kim, S., Larsen, S., Amarasinghe, S., Bachrach, J., Carbin, M., Pacheco, C., Sherwood, F., Sidiroglou, S., Sullivan, G., Wong, W.-F., Zibin, Y., Ernst, M. D., and Rinard, M. 2009. Automatically patching errors in deployed software. In SOSP '09: Proceedings of the ACM SIGOPS 22nd symposium on Operating systems principles. ACM, New York, NY, USA, 87-102.

Ruwase, O. and Lam, M. S. 2004. A practical dynamic buffer overflow detector. In NDSS. The Internet Society.

Sidiroglou, S., Laadan, O., Perez, C., Viennot, N., Nieh, J., and Keromytis, A. D. 2009. Assure: automatic software self-healing using rescue points. In ASPLOS '09: Proceeding of the 14th international conference on Architectural support for programming languages and operating systems. ACM, New York, NY, USA, 37-48.

Wang, L., Zhang, Q., and Zhao, P. 2008. Automated detection of code vulnerabilities based on program analysis and model checking. In Source Code Analysis and Manipulation, 2008 Eighth IEEE International Working Conference on. 165-173.

* cited by examiner

| 500 | 501 | 502 |
|---|---|---|
| 1 | 1 | 1 |
| 2 | 1/2 | 1 |
| 3 | 2 | 1 |
| 4 | 3 | 1 |
| 5 | 4 | 2 |

MEMORY MANAGEMENT SYSTEMS AND METHODS FOR EMBEDDED SYSTEMS

TECHNICAL FIELD

The technical field generally relates to methods and systems for managing memory, and more particularly relates to methods and systems for managing overflow and underflow conditions of memory in embedded systems.

BACKGROUND

Buffer underflow conditions or overflow conditions occur when a software program, while writing data to a buffer, overruns a buffer's boundary and overwrites adjacent memory. Buffer overflow and underflow conditions can be triggered by inputs that are designed to execute code, or alter the way the program operates. This may result in erratic program behavior, including memory access errors, incorrect results, a crash, or a breach of system security. Thus, they are the basis of many software vulnerabilities.

Accordingly, it is desirable to provide methods and systems for managing the memory such that memory can be restored from buffer overflow and underflow conditions. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for managing static memory associated with software of an embedded system. The method includes, but is not limited to, performing one or more steps on one or more processors. The steps include, but are not limited to, selectively assigning memory objects to static memory segments based on access of the memory object by the software; managing data of the memory segments based on the assigning; and selectively restoring the data of the memory segments based on the managing.

A memory management system is provided for managing static memory associated with software of an embedded system. The memory management system includes, but is not limited to, one or more computer readable mediums. The one or more computer readable mediums include, but are not limited to, a first module that selectively assigns memory objects to static memory segments based on access of the memory object by the software. The one or more computer readable mediums further include, but are not limited to, a second module that manages data of the memory segments based on the assignments. The one or more computer readable mediums further include, but are not limited to, a third module that selectively restores the data of the memory segments based on the managing.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
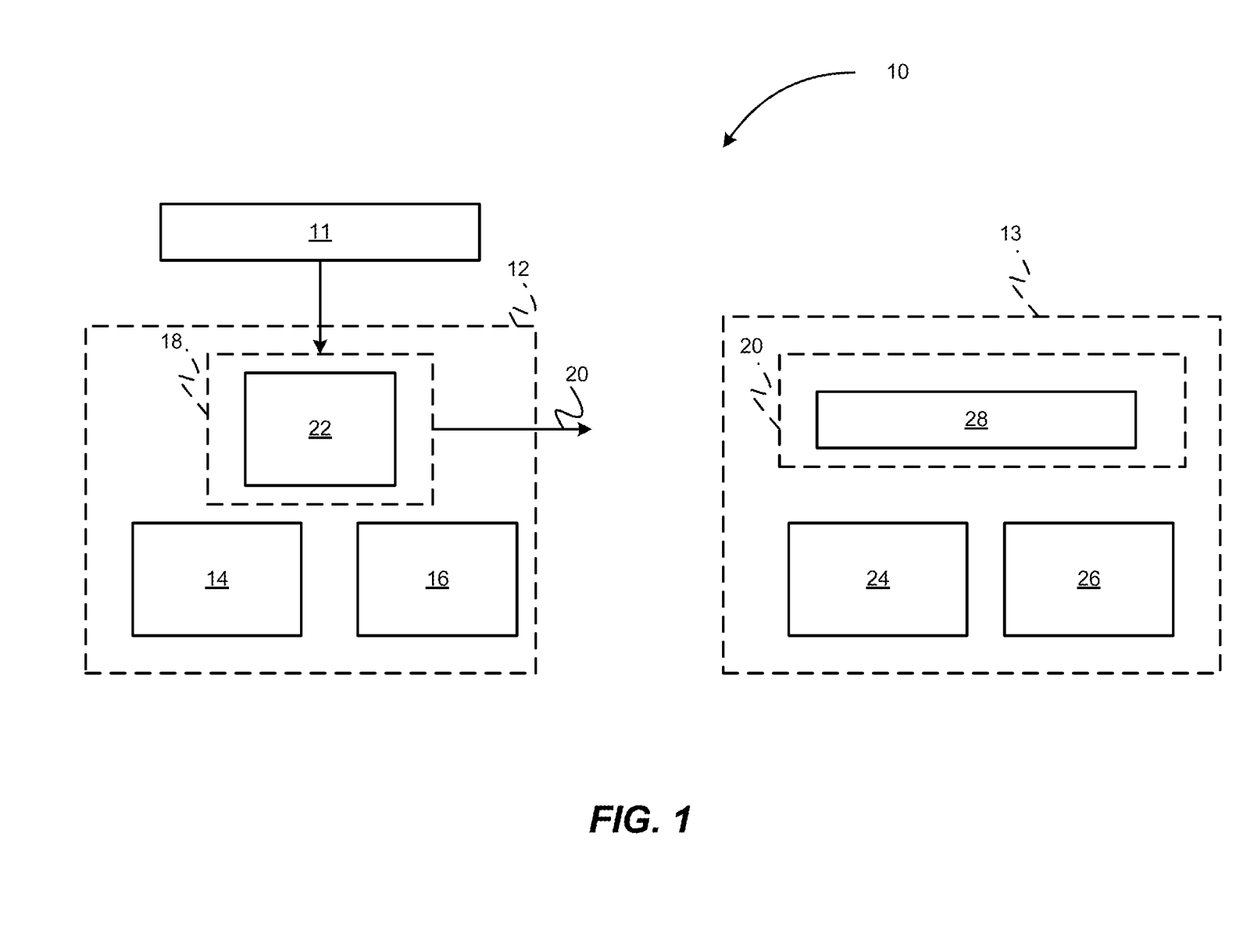
FIG. 1 is functional block diagram of an embedded control system that includes a memory management system in accordance with various embodiments.

Referring now to FIG. 1, a memory management system 10 is shown in accordance with various embodiments. The memory management system 10 manages memory and memory operations such that the memory can be restored when an underflow condition or an overflow condition occurs. In particular, the memory management system 10 manages static memory for a particular software application 11. The software application may be any software that is programmed for a particular embedded system.

In various embodiments, the memory management system 10 includes a computing device 12 and an embedded device 13. Although the figures shown herein depict an example with certain arrangements of elements, additional intervening elements, devices, features, or components may be present in actual embodiments. The computing device 12 includes memory 14 and a processor 16. The memory 14 can be at least one of the random access memory, read only memory, a cache, a stack, or the like which may temporarily or permanently store electronic data. The processor 16 can be any custom made or commercially available processor, a central processing unit, an auxiliary processor among several processors associated with the computing device, a semiconductor based microprocessor, a macroprocessor, or generally any device for executing instructions. As can be appreciated, the computing device 12 can be any computing device including, but not limited to, a desktop computer, a laptop computer, a workstation, a server, a portable handheld device, or other computing device that includes memory and a processor.

Stored in the memory 14 is a software compiler 18. The software compiler 18 includes software instructions that, when executed by the processor 16, compile the software 11 into executable code (SwC) 20. The compiler 18 includes a compile time module 22 in accordance with various embodiments. The compile time module 22, when compiling the software, selectively assigns memory objects of the software 11 to memory segments of static memory that is to be used by the executable code 20 when executing. The assignment of the memory objects is performed such that any buffer overflow and underflow conditions that may occur during execution of the executable code 20 can be identified and responded to. For example, the assignment is performed such that memory objects that may be accessed simultaneously during execution of the executable code 20 are not assigned to adjacent segments of the static memory.

The embedded device 13 includes memory 24 and a processor 26. The memory 24 can be at least one of the random access memory, read only memory, a cache, a stack, or the like which may temporarily or permanently store electronic data. The processor 26 can be any custom made or commercially available processor, a central processing unit, an auxiliary processor among several (core) processors associated with the computing device, a semiconductor based microprocessor, a macroprocessor, or generally any device for executing instructions. As can be appreciated the embedded device 13 can be any embedded software device, including but not limited to, a control device, a consumer electronic, transportation electronic, or any other embedded software device that includes memory 24 and a processor 26.

Stored in the memory 24 of the embedded device 13 is the executable code 20. The executable code 20 includes a run time module 28 that is executed during operation of the software. The runtime module 28 performs methods for recovering from underflow or overflow conditions based on the placement of the memory objects in the static memory. For example, the runtime module 28 selectively copies portions of memory from adjacent memory segments to another area of memory (e.g., a backup stack) and restores the memory affected by an underflow or overflow condition using the copy of the memory. In some cases no memory copy operation may be performed. For example, a memory copy portion size may be set to zero, and then may be adaptively increased with each fault that the system is unable to recover from.

Figure 2:
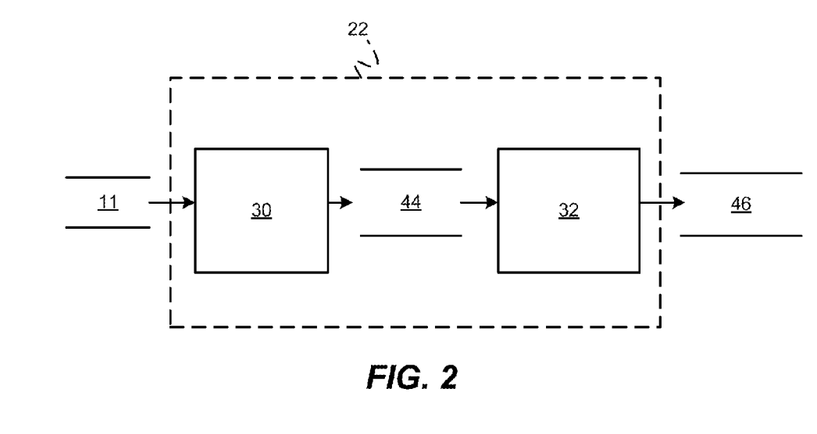
FIGS. 2 and 3 are dataflow diagrams illustrating a memory management system in accordance with various embodiments.
Figure 3:
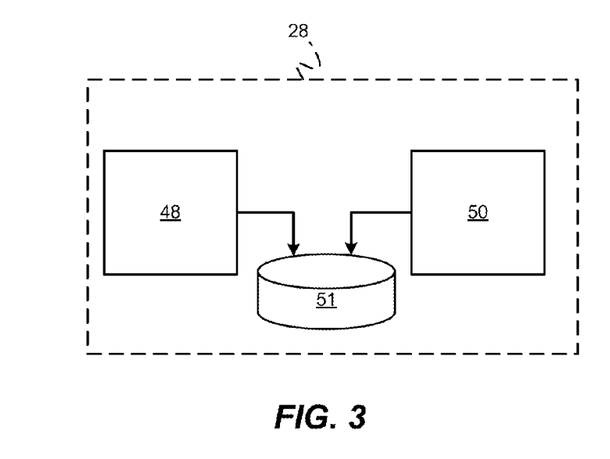

Referring now to FIGS. 2 and 3 and with continued reference to FIG. 1, dataflow diagrams illustrate various embodiments of the compile time module 22 and the runtime module 28 of the memory management system 10. Various embodiments of compile time modules 22 and runtime modules 28 according to the present disclosure may include any number of sub-modules. As can be appreciated, the sub-modules shown in FIGS. 2 and 3 may be combined and/or further partitioned to similarly manage the memory such that recovery from a buffer underflow condition or overflow condition can be achieved.

Figure 4:
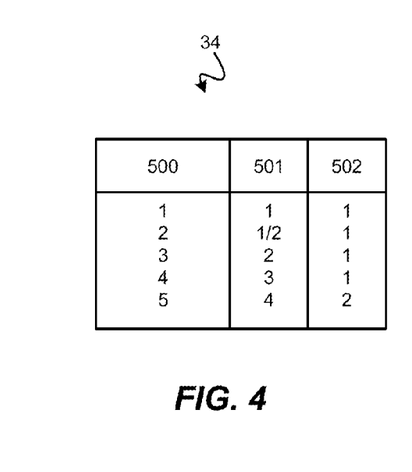
FIG. 4 is an illustration of a memory object map of the memory management system in accordance with various embodiments.
Figure 5:
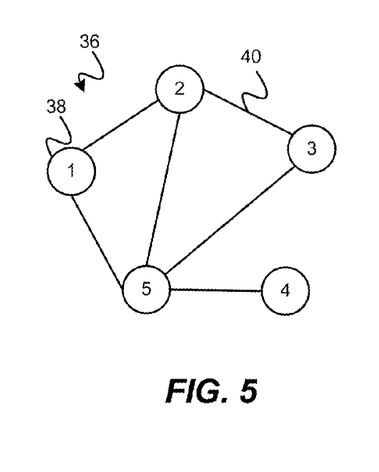
FIG. 5 is an illustration of a simultaneous access graph of the memory management system in accordance with various embodiments.

With reference to FIG. 2, in various embodiments, the compile time module 22 includes a graph determination sub-module 30, and a memory assignment sub-module 32. The graph determination sub-module 30 processes the software 11 to determine a memory object map 34 (FIG. 4). As shown in FIG. 4, the memory object map 34 includes, but is not limited to, a listing of the memory objects 500 (e.g., memory objects 1-5), the software (e.g., functions or subroutines) 501 that utilizes the memory objects (e.g., software 1-4), and the processor or core 502 that the software is to be executed on (e.g., core 1 or core 2). From the memory object map 34, the graph determination sub-module 30 determines a simultaneous access graph (SAG) 36 (FIG. 5). As shown in FIG. 5, the simultaneous access graph 36 includes nodes 38 and edges 40. The nodes 38 represent each memory object. The edges 40 represent each memory object pair that can be accessed simultaneously at SwC granularity.

Figure 6:
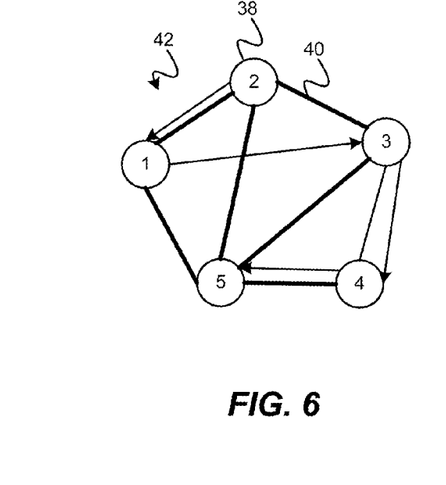
FIG. 6 is an illustration of an allowable neighbors graph of the memory management system in accordance with various embodiments.

From the SAG 36, the graph determination sub-module 30 obtains an allowable neighbors graph 42 (FIG. 6). As shown in FIG. 6, the allowable neighbors graph (ANG) 42 similarly includes the nodes 38 and the edges 40. The edges 40 are weighted based on the severity of the fault if the first memory object of the memory object pairs corrupts the other memory object, the cost incurred if the first memory object corrupts the other memory object, and the probability of the first memory object corrupting the second memory object. For example, the weight can be a value (e.g., from zero to one, or any other value) that indicates the impact of resetting the software, a part of the software, or the system if the memory corruption cannot be recovered by copying back memory objects. Based on the ANG 42, the graph determination sub-module 30 determines a minimum cost layout 44 of the memory objects within the static memory. For example, the graph determination sub-module 30 determines the minimum cost layout by solving a shortest tour problem. The shortest tour problem finds the ordering of memory objects such that the net penalty is minimized. As can be appreciated, other techniques, such as, but not limited to, Simulated Annealing may be used to solve this combinatorial optimization problem.

While the ANG illustrated in this disclosure has undirected edges, it is appreciated that directed graphs may be used if the penalty incurred is not symmetric. For example, when a penalty of a source overflowing or underflowing and corrupting a destination (for an edge between a source and a destination) is not the same as the destination overflowing or underflowing and corrupting the source, then two directed edges may be implemented, each having different weights.

The memory object assignment sub-module 32 receives as input the minimum cost layout 44. Based on the minimum cost layout 44, the memory object assignment sub-module 32 assigns the memory objects to segments of the static memory. For example, the memory object assignment sub-module 32 assigns one of the memory objects of the memory object pair to a non-adjacent segment of the other memory object per the minimum cost layout 44. The memory layout as determined by solving the shortest tour problem presents a total ordering (a single sequence) of the memory objects. The memory object assignment sub-module 32 may simply place the memory objects one after the other as per this total ordering.

With reference to FIG. 3, the runtime module 28 includes an entry sub-module 48 and an exit sub-module 50. The entry sub-module 48 is executed at the start of the software or a portion of the software. The entry sub-module 48 prepares the static memory 51 for recovery from a potential underflow or overflow condition.

Figure 7:
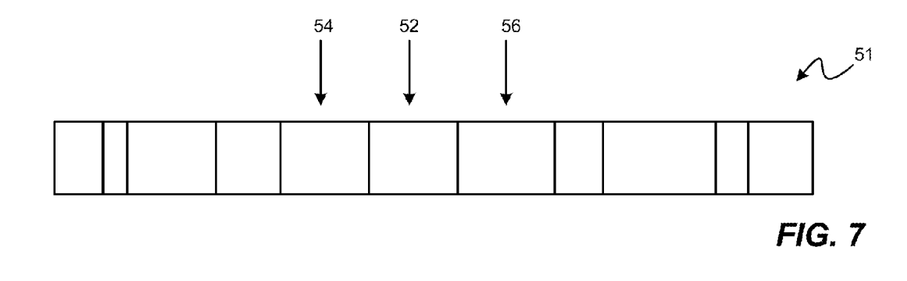
FIGS. 7-12 are illustrations of static memory that is managed by the memory management system in accordance with various embodiments.
Figure 8:
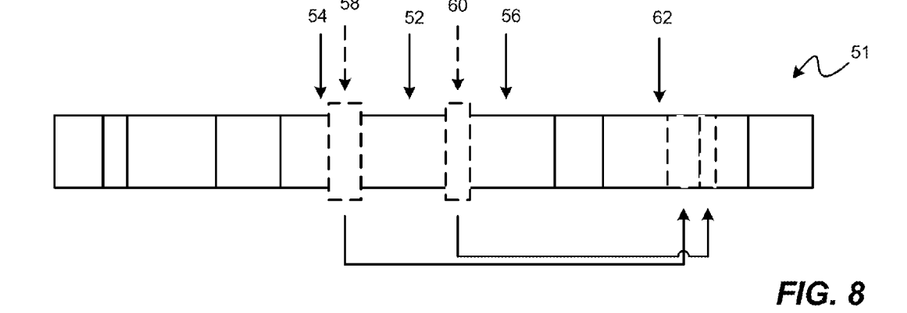
Figure 9:
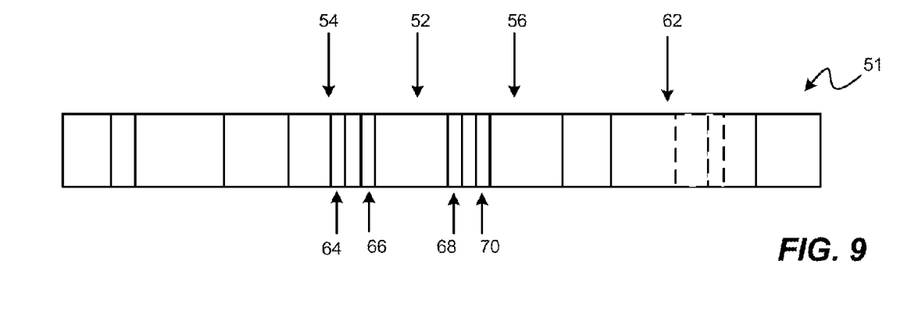

For example, as shown in FIG. 7, the entry sub-module 48 first obtains locks for the memory segments 52 that contain memory objects that are accessed by the software and the memory segments 54, 56 adjacent (i.e., sequentially before and after) to the memory segment 52 that are accessed by the software. The entry sub-module 48 then, as shown in FIG. 8, copies memory portions 58, 60 of a predefined size from the memory segments 54, 56 adjacent to the memory segment 52 to backup memory 62 (e.g., the backup stack). The entry sub-module 48 then, as shown in FIG. 9, sets canaries 64-70 for each of the adjacent memory segments 54, 56. The placement of the canaries 64-70 is based on the predefined size of the memory portions 58, 60.

For example, the canaries 64-70 are values that are placed as pairs between the memory segments 54 and 52 and 52 and 56 such that a failed verification of the canary data is an alert of an overflow or underflow condition and a type of overflow or underflow condition. For example, when an overflow or underflow condition occurs, the first data to be corrupted will be the canary 66 or 68. If only the canary 66 or 68 is corrupted, then the overflow or underflow condition can be recovered from. If the canary 64 or 70 is corrupted, an overflow or underflow condition has occurred which cannot be recovered from. In various embodiments, the canaries are in-situ canaries which are temporal in nature. The canaries can be set by XOR-ing a random number with the memory object With reference back to FIG. 3, the exit sub-module 50 is executed at the end of the software or the portion of software. The exit sub-module 50 evaluates the static memory 51 for overflow or underflow faults and restores any corrupted memory, if possible.

Figure 10:
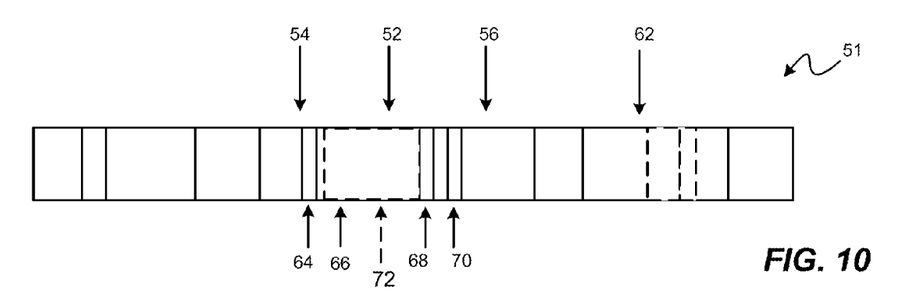
Figure 11:
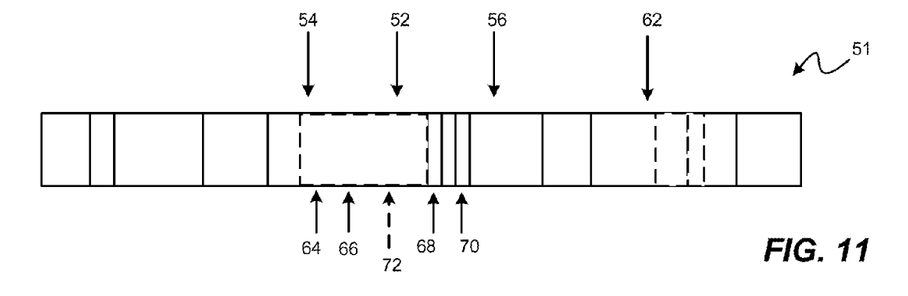
Figure 12:
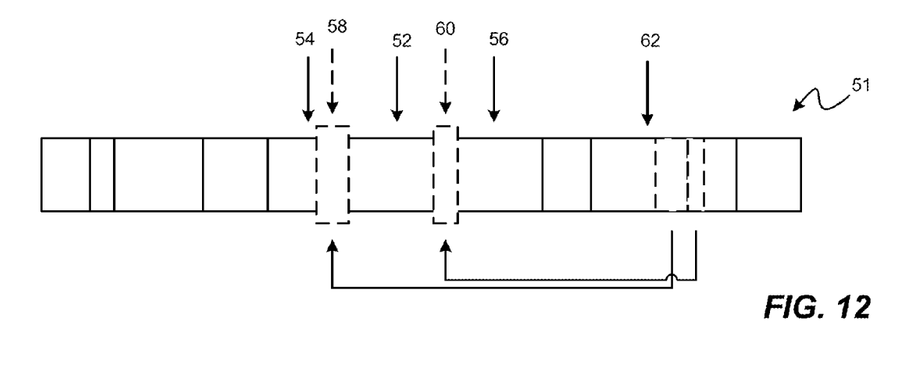

For example, as shown in FIGS. 10-12, the exit sub-module 50 evaluates the canaries 64-70 to determine if either one of the adjacent memory segments have been corrupted by an underflow and/or overflow condition and to determine the severity of the corruption. For example, as shown in FIG. 10, if one of the canaries 66 for the adjacent memory segment 54 does not equal the predefined value, then corruption has occurred. In another example, as shown in FIG. 11, if both of the canaries 66, 64 for the particular adjacent memory segment 54 do not equal the predefined value, the severity of the corruption is such that the static memory 51 cannot be restored.

If the static memory 51 can be restored (as shown in FIG. 10), the exit sub-module 50 restores the corrupted memory object by copying the memory portions 58, 60 from the backup memory 62 back to the memory segments 54 and 56 as shown in FIG. 12 and the locks are released. In various embodiments, the canaries are restored to the original content by XOR-ing it again with the earlier random number. This allows any memory location to be used as a canary for specific intervals of time. If, however, the memory 51 cannot be restored (as shown in FIG. 11), the portion size for the copy is increased, the locks are released, and the software is reset.

Figure 13:
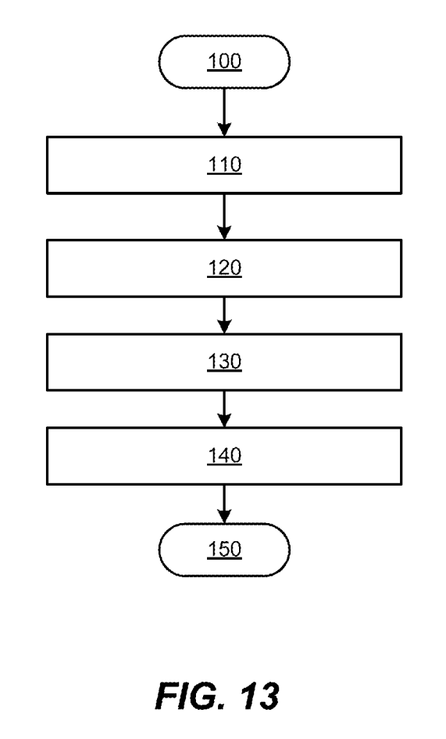
FIGS. 13-15 are flowcharts illustrating memory management methods in accordance with various embodiments.
Figure 14:
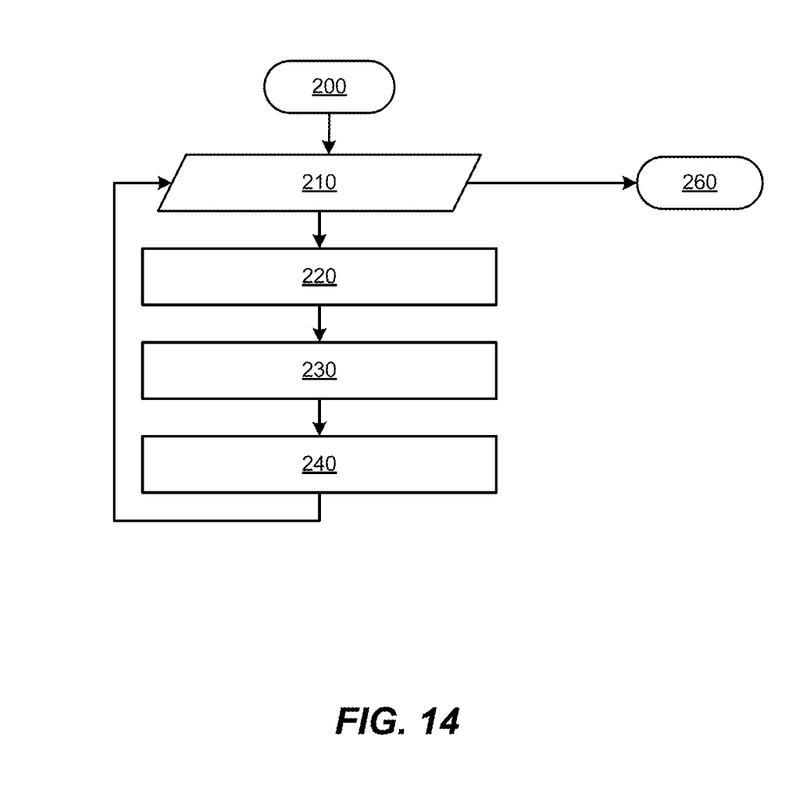
Figure 15:
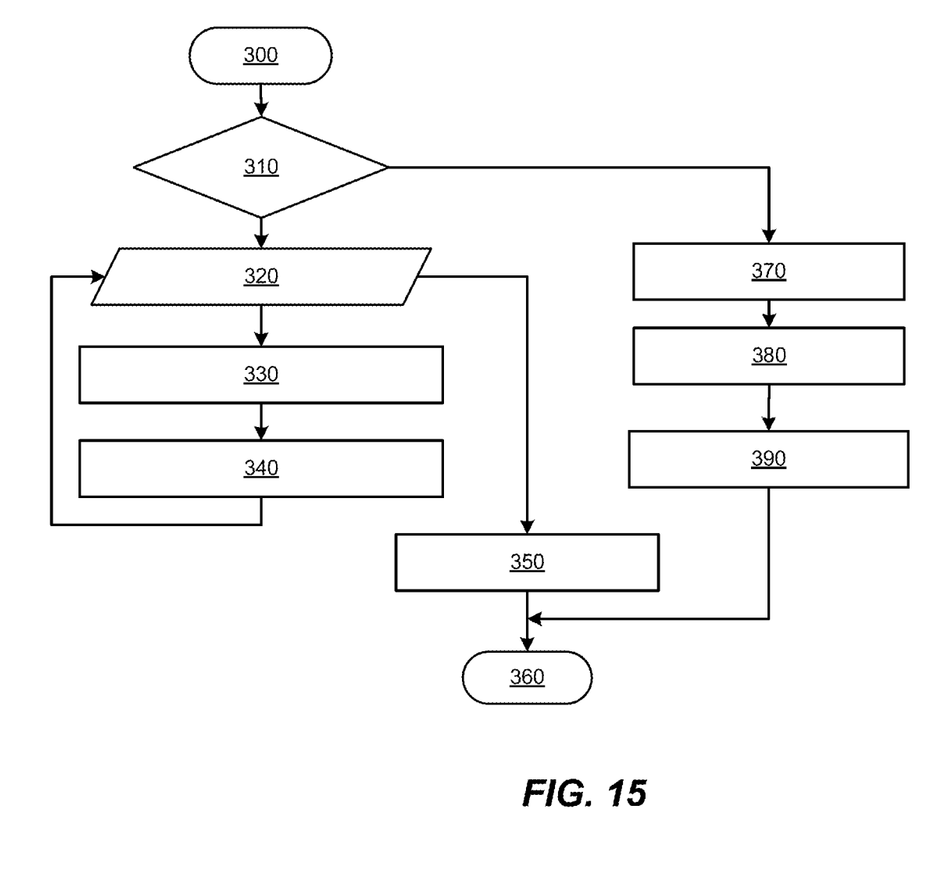

Referring now to FIGS. 13-15, and with continued reference to FIGS. 1 through 12, flowcharts illustrate memory management methods that can be performed by the memory management system 10 of FIG. 1 in accordance with various embodiments. As can be appreciated in light of the disclosure, the order of operation within the methods is not limited to the sequential execution as illustrated in FIGS. 13-15, but may be performed in one or more varying orders as applicable and in accordance with the present disclosure. As can further be appreciated, one or more steps of the method may be added or deleted without altering the spirit of the method.

As can be appreciated, the methods may be scheduled to run at predetermined intervals, or scheduled to run based on predetermined events.

FIG. 13 illustrates an exemplary compile time method that may be performed by the compile time module 22. In one example, the method may begin at 100. The software is evaluated and a SAG 36 is determined at 110. The ANG 42 including the weights is determined at 120. The minimum cost layout 44 is determined from the ANG 42 at 130. The memory objects assignments 46 are determined at 140. Thereafter, the method may end at 150.

FIG. 14 illustrates an exemplary software entry method that may be performed by the entry sub-module 48. In one example, the method may begin at 200. For each memory object of the software SwC that is executing on the core k at 210, the static memory 51 is managed at 220-240. For example, a lock is obtained of the memory segment that contains the memory object to be accessed by the SwC and the adjacent memory segments at 220. The memory portions of the adjacent memory segments are copied to the backup stack at 230; and the canaries are set at 240. Once all of the memory objects for SwC have been processed at 210, the method may end at 260. Thereafter, the software SwC may be executed.

FIG. 15 illustrates an exemplary software exit method that may be performed by the exit sub-module 50. In one example, the method may begin at 300. It is determined whether there is any memory corruption and whether it is restorable at 310. If the memory corruption is restorable at 310, for each memory object of the software SwC that has executed on the core k at 320, the memory segment is restored at 330-340. For example, the memory segments are restored by copying back the memory portions from the backup stack to the memory segment locations at 330; and the memory content used by the canaries are restored at 340. Once all of the memory objects for SwC have been processed at 320, the locks for the memory segments are released at 350 and the method may end at 360.

If, at 310, the memory corruption is not restorable at 310, the size of the memory portions is increased at 370. The locks for the memory segments are released at 380 and the software system/sub-system is reset at 390. Thereafter, the method may end at 360.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of managing static memory for software of an embedded system, comprising:
   performing on one or more processors,
      when compiling the software, selectively assigning memory objects to one of adjacent and non-adjacent static memory segments based on access of the memory objects by the software;
      managing data of the memory segments based on the assigning; and
      selectively restoring the data of the memory segments based on the managing,
   wherein the selectively assigning the memory objects comprises:
   generating a simultaneous access graph;
   determining an allowable neighbors graph based on the simultaneous access graph;
   determining a minimum cost layout from the allowable neighbors graph; and
   selectively assigning the memory objects based on the minimum cost layout.

2. The method of claim 1 wherein the selectively assigning the memory objects comprises selectively assigning memory objects that can be simultaneously accessed by the software to the non-adjacent memory segments.

3. The method of claim 1 wherein the determining the allowable neighbors graph comprises determining a weight for object pairs of the simultaneous access graph.

4. The method of claim 1 wherein the managing the data of the memory segments comprises selectively copying a portion of data from at least one adjacent memory segment to backup memory.

5. The method of claim 4 wherein the managing the data of the memory segments comprises storing at least two canaries in the at least one adjacent memory segment.

6. The method of claim 5 wherein the selectively restoring the data of the memory segments is based on an evaluation of the canaries.

7. The method of claim 6 wherein the restoring occurs when a first canary of the at least two canaries does not equal a predefined value.

8. The method of claim 7 wherein the restoring does not occur when a second canary of the at least two canaries does not equal a predefined value.

9. The method of claim 4 wherein the selectively restoring comprises copying the portion of data from the backup memory back to the at least one adjacent memory segment.

10. The method of claim 1 further comprising selectively resetting the software based on whether the selectively restoring occurs.

11. The method of claim 1 further comprising determining a portion size based on whether the selectively resetting occurs.

12. A non-transitory memory management system for managing static memory associated with software of an embedded system, comprising:
    a computer readable medium comprising:
        a first module that when compiling the software, module generates a simultaneous access graph, determines an allowable neighbors graph based on the simultaneous access graph, determines a minimum cost layout from the allowable neighbors graph, and selectively assigns memory objects to one of adjacent and non-adjacent static memory segments based on the minimum cost layout;
        a second module that manages data of the memory segments based on the assignments; and
        a third module that selectively restores the data of the memory segments based on the managing.

13. The memory management system of claim 12 wherein the first module selectively assigns memory objects that can be simultaneously accessed by the software to the non-adjacent memory segments.

14. The memory management system of claim 12 wherein allowable neighbors graph includes weights for object pairs of the simultaneous access graph.

15. The memory management system of claim 12 wherein the second module copies a portion of data from at least one adjacent memory segment to backup memory and manages the data based on the portion of data.

16. The memory management system of claim 15 wherein the second module stores at least two canaries in the at least one adjacent memory segment.

17. The memory management system of claim 16 wherein the third module selectively restores the data of the memory segments based on an evaluation of the canaries, wherein when a first canary of the at least two canaries does not equal a predefined value, the third module restores the data, and wherein when a second canary of the at least two canaries does not equal a predefined value, the third module does not restore the data.

18. The memory management system of claim 12 wherein the third module selectively resets the software and determines a portion size based on whether the data is restored.

* * * * *